(12) United States Patent
Liou

(10) Patent No.: US 6,913,698 B2
(45) Date of Patent: Jul. 5, 2005

(54) METHOD FOR REDUCING COD (CHEMICAL OXYGEN DEMAND) IN WASTE WATER BY USING $O_3$ WITH VALENT ION CHELATION

(76) Inventor: Huei-Tarng Liou, 3F, No. 6, Alley 20, Lane 85, Chang-Hsing Street, Taipei (TW)

( * ) Notice: Subject to any disclaimer, the term of this patent is extended or adjusted under 35 U.S.C. 154(b) by 0 days.

(21) Appl. No.: 10/394,071

(22) Filed: Mar. 21, 2003

(65) Prior Publication Data

US 2004/0129647 A1 Jul. 8, 2004

(30) Foreign Application Priority Data

Jan. 3, 2003 (TW) ........................................ 92100081 A

(51) Int. Cl.⁷ ................................................ C02F 1/78
(52) U.S. Cl. ........................ 210/721; 210/759; 210/760; 210/908
(58) Field of Search ................................ 210/721, 724, 210/749, 758, 759, 760, 908

(56) References Cited

U.S. PATENT DOCUMENTS

| | | | | |
|---|---|---|---|---|
| 4,332,687 A | * | 6/1982 | Daignault et al. | 210/721 |
| 4,689,154 A | * | 8/1987 | Zimberg | 210/667 |
| 5,492,633 A | * | 2/1996 | Moniwa et al. | 210/760 |
| 6,056,885 A | * | 5/2000 | Wasinger | 210/760 |
| 6,402,966 B1 | * | 6/2002 | Taira | 210/760 |

FOREIGN PATENT DOCUMENTS

| | | |
|---|---|---|
| DE | 40 02 014 A1 | 8/1990 |
| JP | 56150483 A * | 11/1981 |
| JP | 56163794 A * | 12/1981 |
| JP | 56163796 A * | 12/1981 |
| JP | 59203692 A * | 11/1984 |
| JP | 03137990 | 6/1991 |
| JP | 2002153886 | 5/2002 |

OTHER PUBLICATIONS

"Chemical Oxygen Demand," Hawley's Condensed Chemical Dictionary, 14$^{th}$ Edition, John Wiley & Sons, Inc., 2002.*

"Organic Ozone Chemistry: Fundamentals and Synthetic Potentials," K. Griesbaum, Inter. Ozone Assoc. 313–324 (1999).

"Industrial Application of Ozonolysis in the Fine Chemical Production," B. Schober, Inter. Ozone Symposium 325–333 (1999).

Sarasa et al., "Treatment of a Wastewater Resulting From Dyes Manufacturing With Ozone and Chemical Coagulation", Wat. Res. vol. 32, No. 9, pp 2721–2727 (1998).

* cited by examiner

*Primary Examiner*—Frank M. Lawrence
(74) *Attorney, Agent, or Firm*—Scully, Scott, Murphy & Presser

(57) ABSTRACT

Techniques for treating waste water by adding a valent ion, such as $CaO/CaCO_3$, which depends on the pH value of the waste water, to reduce the chemical oxygen demand (COD) are provided. Organic acid intermediates formed from the oxidization of organics with ozone will chelate with valent ions dissolved in water and precipitate from the waste water, so as to reduce the amount of ozone consumed and save cost. The method of the present invention is preferably conducted by adjusting the pH value of the reaction and/or adding hydrogen peroxide.

20 Claims, 1 Drawing Sheet

METHOD FOR REDUCING COD (CHEMICAL OXYGEN DEMAND) IN WASTE WATER BY USING $O_3$ WITH VALENT ION CHELATION

FIELD OF THE INVENTION

This invention relates to a method of treating waste water containing organics, and more specifically, to a method for reducing chemical oxygen demand (COD) in waste water by using ozone plus valent ion chelation.

BACKGROUND OF THE INVENTION

With highly industrialized development and fast increase of population, the treatment of waste water has become an important issue for modern cities. When using ozone to reduce the COD in waste water by oxidizing organics containing oil, fatty oil, etc., the most common primary products are organic acids, alcohols, or aldehydes, depending on the rate of oxidization reaction. Please refer to International Ozone Symposium Proceedings 21–22 Oct. 1999, Basel. In these cases, the COD has only been marginally lowered. If an attempt to continue the oxidation reaction until the organic acids, alcohols, and aldehydes are further oxidized into carbon dioxide and water is desired, the reaction process will be slow and a large amount of ozone will be consumed. Advanced oxidization processes, such as the use of hydrogen peroxide with ozone, the use of UV radiation with ozone, and the use of catalysts with ozone, are generally able to increase the reaction rate of the oxidization process for the treatment of waste water. However, these processes cannot lower the ozone consumption, and often add greatly to the total cost.

In view of the known technologies, the present invention provides a new and ozone-saving method to treat organics-containing waste water. That is, when organic acid intermediates are formed from the oxidization of organics by ozone, they chelate with valent ions dissolved in water and precipitate from the waste water, so as to reduce the amount of ozone consumed and greatly achieve the purpose of cost-saving.

SUMMARY OF THE INVENTION

The present invention relates to a method for reducing COD in waste water, which is characterized in that a valent ion, capable of terminating oxidation of organics in the waste water by ozone depending on the pH value of the waste water, is used with ozone to reduce the COD of organics contained in the waste water. The method of the present invention has the advantages of reducing ozone consumption, simplifying the oxidation process involved in the waste water, and saving cost, and can be widely used in industry.

DETAILED DESCRIPTION OF THE INVENTION

Figure 1:
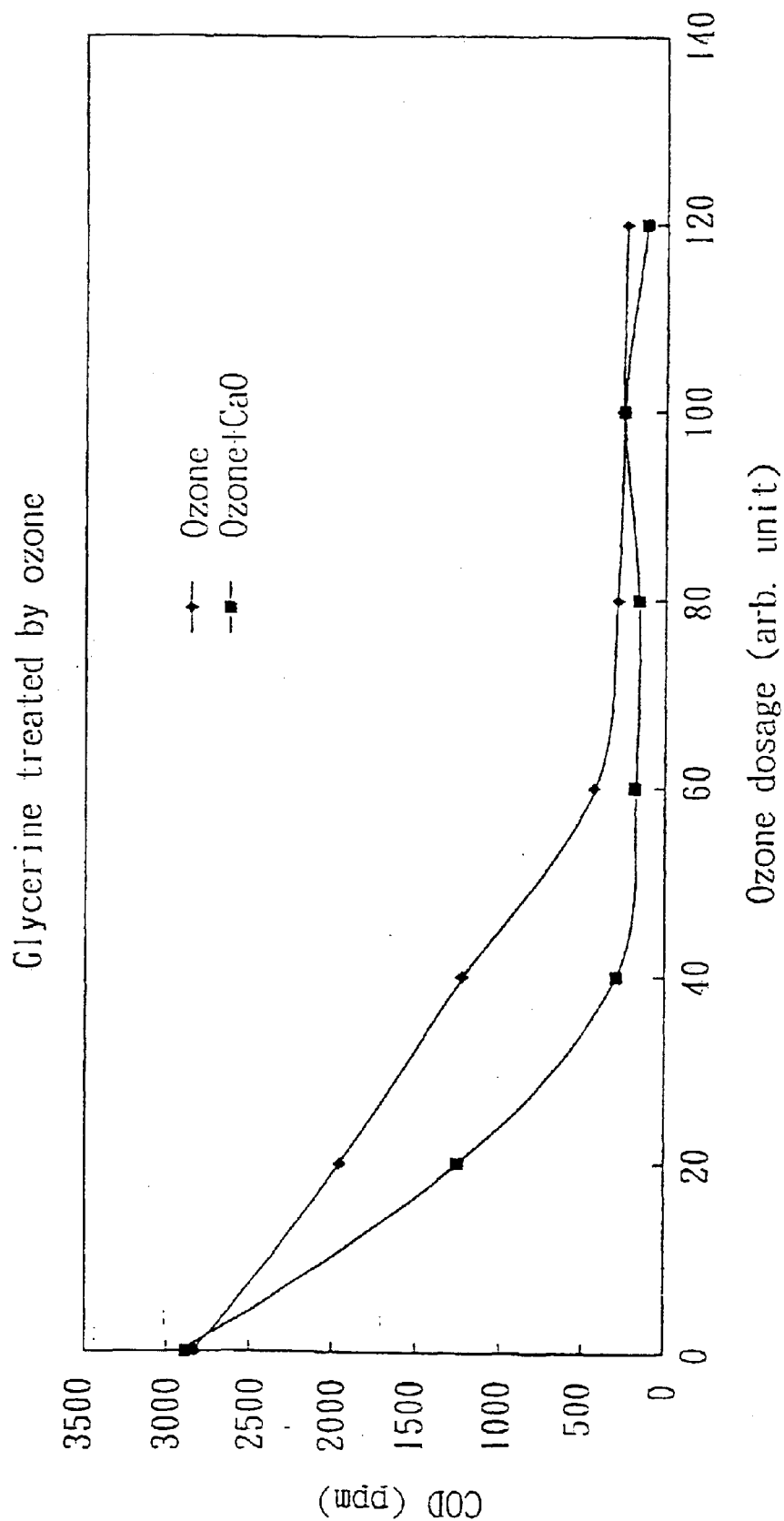
FIG. 1 illustrates the relationships between COD and ozone dosage of the method of the present invention and that of conventional method using ozone only.

The phrase "valent ion" used herewith refers to any valent ion which is capable of terminating the oxidation of organics in waste water by ozone. Such valent ion is suitable for the method of the present invention, preferably, sodium ion, potassium ion, calcium ion, magnesium ion, aluminum ion, iron ion, chromium ion, titanium ion, and niobium ion. The calcium ion is selected from the group consisting of calcium carbonate, calcium hydroxide, and calcium oxide. The magnesium ion is selected from the group consisting of magnesium carbonate, magnesium hydroxide, and magnesium oxide. The aluminum ion is selected from the group consisting of alumina and aluminum hydroxide.

In accordance with the present invention, the method for reducing COD in waste water may further comprise adding hydrogen peroxide. The additional use of hydrogen peroxide in the invention is found to have preferred results.

Taking calcium ion as an example of a divalent ion used in the method of the present invention, when calcium carbonate is used, the pH value of the waste water is preferably within the range of 2 to 4, and when calcium hydroxide or calcium oxide is used, the pH value of the waste water is preferably within the range of 9 to 13. Calcium carbonate, calcium hydroxide and calcium oxide dissolve in water to form the calcium ion ($Ca^{2+}$) and two hydroxide ions ($OH^-$). The calcium ion does not significantly affect the oxidization powers of ozone.

The most common primary products of the conventional oxidation of organics contained in waste water with ozone are organic acids, alcohols, or aldehydes, depending on the rate of oxidization reaction. In the present invention, the valent ion can be added at any time when the organics are oxidized to organic acids, alcohols, or aldehydes to terminate the oxidization. Preferably, the valent ion is added to the method of the present invention when the organics are oxidized to organic acids. That is because carboxylic acid functional groups are formed on the molecule, and the molecule will chelate upon the calcium ion and precipitate from the waste water. Therefore, it is only necessary to oxidize the organics in waste water to organic acids in the method of the invention using ozone with calcium carbonate or calcium oxide. All the COD in a given amount of waste water, the amount of ozone consumption and the time required to lower the COD in the present invention are greatly reduced as compared with conventional methods using ozone only or other advanced oxidization processes as stated above. Due to the low cost of calcium oxide and calcium carbonate and the easy treatment of precipitates, the method of the present invention will significantly reduce the cost of handling the waste water.

Depending on the pH value of the waste water, a valent ion is added into the waste water in any suitable amount, which can be determined by persons skilled in the art, either before adding ozone or whenever the organic acids formed from the oxidization of organics with ozone. Preferably, the valent ion is added in the amount of about one equivalent valent ion per one unit of COD to two equivalents valent ion per one unit of COD, more preferably in the amount of about one equivalent valent ion per one unit of COD. That is, when calcium carbonate or calcium oxide is used, it is in the amount of about one equivalent calcium ion per one unit of COD to two equivalents calcium ion per one unit of COD. It is conventional that the unit of COD is, for instance, mg/L.

If $CO_2$ bubbles form after some time, it is proof that ozone is reacting with the organic molecules in the waste water. At this time, the calcium oxide dissolved in the waste water forms a gel, depending on its amount added. The reduction of COD depends on the dosage of ozone used. In a basic condition, the valent ion will form a gel. In an acidic condition, precipitates will form. Stirring may facilitate gel formation. The present invention has the following advantages: (1) it is only necessary to oxidize the organics in waste water to organic acids in the method of the invention, and then remove the formed acids from the waste water by chelating with the valent ion and precipitation so as to reduce the COD in the waste water; (2) the method of the invention will be even more effective if used upon large molecules of organics; (3) cheap valent ions such as calcium ion can be directly used in the method of the invention to reduce the total cost.

The following examples serve to explain the invention in more detail, but not to limit the invention.

EXAMPLE

This example illustrates the method for reducing chemical oxygen demand (COD) in waste water of the present invention by the oxidation of glycerine (1,2,3-propanetriol $C_3H_5(OH)_3$) in a calcium oxide solution. First, calcium oxide (CaO) was dissolved into basic waste water containing glycerine. Then ozone ($O_3$) was injected through bubble column method into waste water to react with glycerine and calcium oxide.

On the other hand, the above experiment was repeated except CaO was not used. That is, $O_3$ alone was used to oxidize glycerine contained in the waste water. The experimental data were collected and prepared as the relationships between COD and ozone dosage of the method of the present invention and that of conventional method using ozone alone in FIG. 1.

As shown in FIG. 1, the ozone consumption of the $O_3$+CaO treatment was only two thirds of $O_3$ alone. If we assume that without CaO each glycerine molecule requires 5.6 ozone molecules on average, then this 6:4 reduction implies a reduction of two ozone molecules from the reaction process. This is because glycerine molecules that are oxidized into carboxylic acids are removed from the reaction process by precipitation of the calcium ion chelate.

It is found that hydrogen peroxide ($H_2O_2$) can be added to the above experiments to optimize the method of the invention.

Although the present invention has been described in detail in the foregoing for the purpose of illustration, it is to be understood that such detail is solely for that purpose and that variations can be made therein by those skilled in this art without departing from the spirit and scope of the present invention except as it may be limited by the claims.

What is claimed is:

1. A method for reducing chemical oxygen demand (COD) in waste water containing organics comprising introducing into waste water which contains organics ozone which oxidizes the organics and a valent ion capable of terminating oxidation of the organics contained in the waste water, wherein the valent ion is added when the organics are oxidized to alcohols, to terminate the oxidation by valent ion chelation.

2. The method according to claim 1 wherein the valent ion is selected from the group consisting of sodium ion, potassium ion, calcium ion, magnesium ion, aluminum ion, iron ion, chromium ion, titanium ion, and niobium ion.

3. The method according to claim 2, wherein the valent ion is a calcium ion selected from the group consisting of calcium carbonate, calcium hydroxide and calcium oxide.

4. The method according to claim 2, wherein the valent ion is a magnesium ion selected from the group consisting of magnesium carbonate, magnesium hydroxide and magnesium oxide.

5. The method according to claim 1 further comprising adding of hydrogen peroxide.

6. The method according to claim 3 wherein, when calcium carbonate is used, the pH value of the waste water is adjusted to a range of 2 to 4.

7. The method according to claim 3 wherein, when calcium oxide or calcium hydroxide is used, the pH value of the waste water is adjusted to a range of 9 to 13.

8. The method according to claim 1, wherein the valent ion is added in an amount of about 1 to 2 equivalents valent ion per unit of COD.

9. The method according to claim 2, wherein the valent ion is an aluminum ion selected from the group consisting of alumina and aluminum hydroxide.

10. A method for reducing chemical oxygen demand (COD) in waste water containing organics comprising introducing ozone which oxidizes the organics and a valent ion capable of terminating oxidation of the organics in the waste water, wherein the valent ion is added when the organics are oxidized to aldehydes, to terminate the oxidation by valent ion chelation.

11. The method according to claim 10 wherein the valent ion is selected from the group consisting of sodium ion, potassium ion, calcium ion, magnesium ion, aluminum ion, iron ion, chromium ion, titanium ion and niobium ion.

12. The method according to claim 11 wherein the valent ion is a calcium ion selected from the group consisting of calcium carbonate, calcium hydroxide and calcium oxide.

13. The method according to claim 11, wherein the valent ion is a magnesium ion selected from the group consisting of magnesium carbonate, magnesium hydroxide and magnesium oxide.

14. The method according to claim 10 further comprising adding of hydrogen peroxide.

15. The method according to claim 12 wherein, when calcium carbonate is used, the pH value of the waste water is adjusted to a range of 2 to 4.

16. The method according to claim 12 wherein, when calcium oxide or calcium hydroxide is used, the pH value of the waste water is adjusted to a range of 9 to 13.

17. The method according to claim 10 wherein the valent ion is added in an amount of about 1 to 2 equivalents valent ion per unit of COD.

18. The method according to claim 1, wherein the valent ion is an aluminum ion selected from the group consisting of alumina and aluminum hydroxide.

19. A method for reducing chemical oxygen demand (COD) in waste water comprising the steps of:

concurrently introducing ozone and a valent ion capable of terminating oxidation of organics contained in waste water to waste water containing organics; and continuously adding the valent ion to said waste water when said organics are oxidized to acid by valent ion chelation wherein said oxidation by ozone is terminated.

20. The method according to claim 19 wherein the valent ion is added in an amount of about 1 to 2 equivalents valent ion per unit of COD.

* * * * *